July 12, 1932.  A. C. DURDIN, JR  1,866,551
SEAL FOR SHAFTS
Filed Oct. 13, 1928
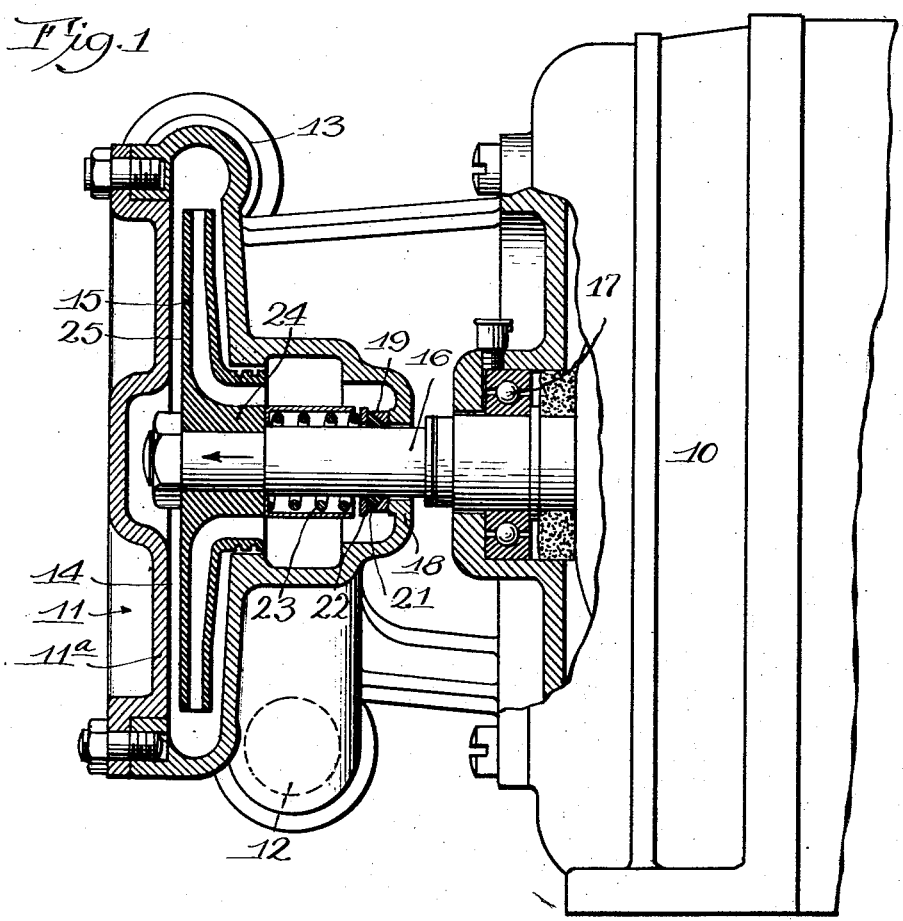
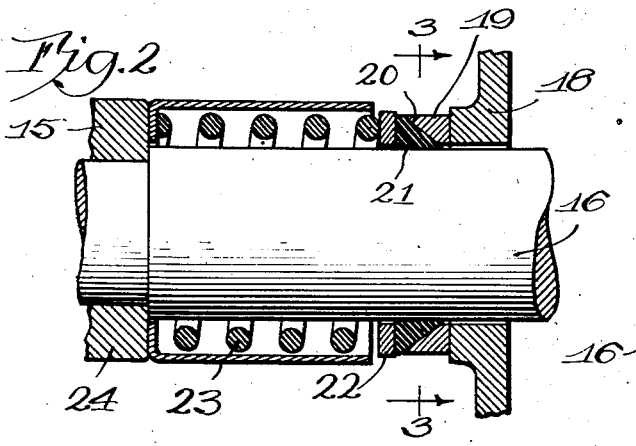
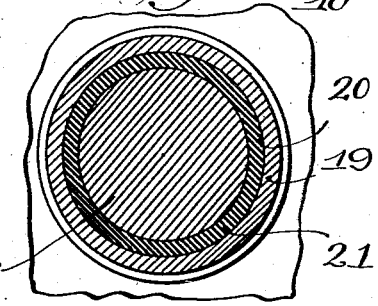

Patented July 12, 1932

1,866,551

UNITED STATES PATENT OFFICE

AUGUSTUS C. DURDIN, JR., OF CHICAGO, ILLINOIS, ASSIGNOR TO CHICAGO PUMP COMPANY, OF CHICAGO, ILLINOIS, A CORPORATION OF ILLINOIS

SEAL FOR SHAFTS

Application filed October 13, 1928. Serial No. 312,295.

This invention relates to seals for shafts, and its principal object is to provide a novel seal frictionally held on the shaft so as to rotate therewith and held in close contact with the wall through which the shaft extends, whereby leakage of liquid (or gas) is prevented through the clearance space between the wall and the shaft. This invention has been devised especially for use in connection with motor driven pumps, although its use is not limited thereto.

Seals of this type employ a spring for holding one of the sealing members of the seal against the wall of the pump case, and it has been found that when used in connection with an electric motor employing ball bearings for the motor shaft, the spring acts to bind the ball bearings, thereby impairing the efficient action of the motor. In accordance with the present invention, the parts have been disposed so as to relieve the bearings from the action of the spring during the operation of the motor, consequently, permitting it to operate at its fullest efficiency.

The invention consists, therefore, in a seal for shafts in which the spring pressure exerted by the spring element of the seal is counteracted by the pressure of the liquid which is being pumped, whereby the bearings are relieved of the binding effect normally caused by the spring. It further consists in the provision of a seal for shafts in which the spring is interposed between one of the sealing members of the seal and the impeller of the pump and serves to exert a pressure in a direction opposite to that exerted by the pressure of the liquid which is being pumped.

It further consists in a seal for shafts having a novel construction and arrangement, including a compressible or resilient seal ring, and novel means for obtaining increased efficiency on the part of the compressible ring. It further consists in the several novel features hereinafter fully set forth and claimed.

The invention is clearly illustrated in the drawing accompanying this specification in which—

Figure 1 is a view partly in side elevation and partly in central vertical longitudinal section of a motor driven pump showing a simple embodiment of the present invention applied thereto;

Fig. 2 is an enlarged detail central vertical longitudinal section of a fragment of the motor shaft showing the seal thereon; and Fig. 3 is a detail vertical cross section taken on the line 3—3 of Fig. 2.

Referring to said drawing which illustrates a simple embodiment of the present invention, the reference character 10 designates an electric motor and 11 a water pump driven thereby. The inlet to the case 11ª of the pump is designated by 12 and the discharge by 13. In the chamber 14 of the pump case is the pump impeller 15 which is mounted upon the motor shaft 16. Ball bearings, one set of which is shown at 17, are provided in the motor for its shaft 16, but any other type of bearings may be provided, as is well understood. The motor shaft 16 extends out through a wall 18 of the pump casing, and the seal forming the subject matter of this specification is employed for preventing leakage of liquid (or gas) out through the clearance space around the shaft 16 at the place where it passes through the wall 18 of the pump case.

Surrounding the shaft is the sealing member here shown as comprising, among other things, a hardened steel ring 19, one side face of which is ground flat and bears against the adjacent flat face of the wall 18, which is also ground to provide a close running fit between the wall and ring. The ring is provided with an annular part 20 spaced away from and overhanging the shaft. The annular part 20 is shown as formed with a tapered or flaring internal face, and between the shaft 16 and said flaring face is a rubber or other resilient seal ring 21 which is held under compression between said flaring internal face and shaft, making a tight fit with both of said elements and preventing the passage of liquid (or gas) therebetween.

Adjacent the ring 19 is an annular member, here shown in the form of a washer 22, against which bears one end of a coiled compression spring 23 that surrounds the shaft and bears at its other end against the hub 24 of the pump impeller 15. The tension of the spring is exerted to hold the ring 19 of the sealing member in close contact with the ground face of the case wall 18, and to compress the rubber or resilient seal ring 21 between the flared internal face of the ring 19 and the cylindrical face of the shaft 16, and in doing so, it exerts pressure against the hub of an impeller in the direction of the arrow $x$ thereon in Fig. 1. Pressure on the impeller in this direction causes a binding action on the ball bearings of the motor while the latter is at rest; when, however, the pump is in operation, the pressure of the liquid in the pump case acts on the side 25 of the impeller, thereby counteracting the action of the spring on the impeller and relieving the ball bearings of the strain thereon which would otherwise be occasioned by the spring. Considerable clearance space is provided between the ring 19 and the shaft 16 whereby the ring may wabble upon the shaft so that its entire flat face may have a true running fit against the adjacent flat face of the wall 18. Theoretically, the shaft 16 extends at right angles to the flat face of the wall 18, but, as a matter of practice, it is almost impossible to obtain such accuracy of workmanship that a true right angle is obtained between the axis of the shaft and the plane of the flat face of the wall. For instance, the shaft may be slightly out of alignment or the flat face may not be machined precisely at right angles to the shaft, the result being that if the ring is fairly tight upon the shaft it can only travel in a plane at right angles to the shaft with the result that it does not contact throughout its entire face with the adjacent face of the wall, thereby permitting a slight leak. When loosely fitted upon the shaft, it may wabble thereon so as to have a true running fit throughout its entire face with the face of the wall and it is held in such intimate contact with the wall by the yieldable resilient ring 21.

It will be seen, therefore, that the spring acts to hold the ring 19 of the sealing members in close contact with the adjacent face of the wall and acts to hold the rubber or other resilient seal ring 21 under compression between the flaring internal face of the ring 19 and the cylindrical face of the shaft, thereby holding the seal ring tightly upon the shaft besides counteracting the pressure of the water upon the impeller when the pump is in operation. It will further be understood that the sealing members rotate with the shaft, and that because of the closely contacting faces of the ring 19 and wall 18 of the case, an efficient leak proof joint is provided between the pump shaft and case wall. Moreover, it will be observed that any oscillation or reciprocation of the shaft will not unseat the ring 19, since the pressure of the spring 23 is always exerted upon the sealing members in a direction to hold the ring 19 in close contact with the case wall. It will be observed that after the shaft has been rotated a short while, the closeness of the fit between the ground faces of the hardened steel ring 19 and case wall will improve, thereby further ensuring a leak proof joint between the ring and case wall.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. A seal for shafts comprising a case wall, a shaft bearing, a rotating shaft mounted in said bearing and extending through said case wall, an impeller on said shaft, said impeller being subject to water pressure in a lateral direction when in operation, thereby placing end thrust on said shaft, sealing ring members surrounding said shaft, one of said sealing ring members having a flat face bearing against a flat face of the wall and one of said sealing ring members comprising a resilient seal ring held under compression between the first mentioned sealing ring member and shaft, and a coiled compression spring surrounding the shaft and confined under compression between said impeller and the sealing ring members and acting to apply pressure upon the sealing ring members and to counteract end thrust of the shaft and therewith relieve the bearing from end thrust.

2. The combination with a motor shaft and a bearing therefor, of a chambered pump case having a wall through which said motor shaft extends into the pump case, an impeller in said pump case and mounted on said shaft, said impeller being subject to water pressure in a lateral direction when in operation, whereby end thrust is placed on the motor shaft, contacting sealing ring members surrounding said shaft with one ring member thereof in close contact with an adjacent face of said case wall, and one ring member in frictional contact with the motor shaft, and a coiled spring held under compression between said impeller and the sealing ring members and serving to apply pressure upon the sealing members and to counteract the lateral pressure on the impeller when in operation, whereby end thrust caused by said pressure is counteracted by said spring and end thrust on the bearing is minimized.

AUGUSTUS C. DURDIN, Jr.